(12) United States Patent
Kuroda et al.

(10) Patent No.: US 8,896,855 B2
(45) Date of Patent: Nov. 25, 2014

(54) IMAGE PROCESSING APPARATUS, METHOD OF CONTROLLING THE SAME AND STORAGE MEDIUM STORING PROGRAM TO PERFORM PROCESSING OF THE SAME

(75) Inventors: Masaki Kuroda, Kanagawa (JP);
Yukiko Kikuchi, Kanagawa (JP);
Yoshihiro Sekine, Kanagawa (JP);
Akihito Toyoda, Kanagawa (JP);
Yasushi Ichinowatari, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1950 days.

(21) Appl. No.: 11/228,301

(22) Filed: Sep. 19, 2005

(65) Prior Publication Data

US 2006/0061813 A1 Mar. 23, 2006

(30) Foreign Application Priority Data

Sep. 22, 2004 (JP) ................................. 2004-275795

(51) Int. Cl.
*G06F 3/12* (2006.01)

(52) U.S. Cl.
CPC ............ *G06F 3/1286* (2013.01); *G06F 3/1253* (2013.01); *G06F 3/1204* (2013.01)
USPC ........................................ 358/1.14; 358/1.15

(58) Field of Classification Search
USPC ......... 358/1.1, 1.15, 1.9; 346/107.3; 709/247; 8/1.1, 1.15, 1.9
See application file for complete search history.

(56) References Cited

U.S. PATENT DOCUMENTS

| 2005/0010809 A1 * | 1/2005 | Hayano ......................... 713/200 |
| 2005/0099650 A1 * | 5/2005 | Brown et al. ................. 358/1.15 |
| 2005/0111013 A1 * | 5/2005 | Maekawa ....................... 358/1.1 |

FOREIGN PATENT DOCUMENTS

| JP | 2002086847 | * | 3/2002 | ............... B41J 29/38 |
| JP | A 2002-086847 | | 3/2002 | |

* cited by examiner

*Primary Examiner* — King Poon
*Assistant Examiner* — Iriana Cruz
(74) *Attorney, Agent, or Firm* — Oliff PLC

(57) ABSTRACT

An image processing apparatus having an operation panel and capable of accessing a network by operation of the operation panel, comprises a determination unit that determines whether or not an operation performed on the operation panel is a control operation relating to the image processing apparatus; a print job receiving unit that receives a print job from the network; and a job control unit that executes the print job received by the print job receiving unit if the determination unit determines, when the print job is received by the print job receiving unit, that the operation panel is being operated and that the operation performed on the operation panel is a control operation relating to the image processing apparatus.

6 Claims, 7 Drawing Sheets

| ACCESS DESTINATION | APPLIED CONDITIONS | USE STATE OF OPERATION PANEL |
|---|---|---|
| ACCESSING IP ADDRESS OR URL IS LOOPBACK ADDRESS, OR IP ADDRESS OR URL OF PRINTER ITSELF | ALL CASES | DETERMINED THAT OPERATION PANEL IS USED FOR SETTING OR CONTROLLING PRINTER |
| IP ADDRESS OR URL OTHER THAN THOSE ABOVE | CONTROL COMMAND HAS BEEN SENT FROM ACCESSING SERVER | DETERMINED THAT OPERATION PANEL IS USED FOR SETTING OR CONTROLLING MULTIPLE-FUNCTION PRINTER |
| | OTHER CASES THAN ABOVE | DETERMINED THAT OPERATION PANEL IS USED AS BROWSER FOR ACCESSING EXTERNALLY |

IMAGE PROCESSING APPARATUS, METHOD OF CONTROLLING THE SAME AND STORAGE MEDIUM STORING PROGRAM TO PERFORM PROCESSING OF THE SAME

BACKGROUND OF THE INVENTION

1. Field of the Invention

The present invention relates to an image processing apparatus having an operation panel and capable of accessing a network by operation of the operation panel, and a method of controlling the image processing apparatus and a storage medium storing a program to perform processing of the image processing apparatus. In particular, the present invention relates to an image processing apparatus which is designed such that even when its operation panel is being operated, a print job received from a party other than the operator of the operation panel can be executed depending on circumstances, and relates to a method of controlling the image processing apparatus and a storage medium storing a program to perform processing of the image processing apparatus.

2. Description of the Related Art

Conventionally, an image processing apparatus such as a copier and a multiple-function printer is provided with an operation panel capable of receiving commands from a user.

It is known to provide an operation panel provided with a web (World Wide Web) browser. Therefore, according to this operation panel, screen layout of the operation panel can be changed easily by the fact that the operation panel is able to display a screen formed from HTML (Hyper Text Markup Language) data.

If the image processing apparatus is connected to a network, the operation panel uses its web browser function to access an external server via the network and to display on the web browser a list of documents managed by the external server, whereby the user is allowed to select his/her desired document from the list of documents. Thus, the document on the external server can be printed easily.

However, in the known image processing apparatus, when the operation panel is being operated, a print job instructed by a party other than the operator of the operation panel cannot be executed.

SUMMARY OF THE INVENTION

According to an aspect of the present invention, an image processing apparatus having an operation panel and capable of accessing a network by operation of the operation panel, comprises a determination unit that determines whether or not an operation performed on the operation panel is a control operation relating to the image processing apparatus; a print job receiving unit that receives a print job from the network; and a job control unit that executes the print job received by the print job receiving unit if the determination unit determines, when the print job is received by the print job receiving unit, that the operation panel is being operated and that the operation performed on the operation panel is a control operation relating to the image processing apparatus.

BRIEF DESCRIPTION OF THE DRAWINGS

Embodiments of the present invention will be described in detail based on the following figures, wherein.

DETAILED DESCRIPTION OF THE INVENTION

Detailed description will now be made, with reference to the accompanying drawings, of embodiments of an image processing apparatus, and a method of controlling the image processing apparatus and a storage medium storing a program to perform processing of the image processing apparatus according to the present invention.

First Embodiment

Figure 1:
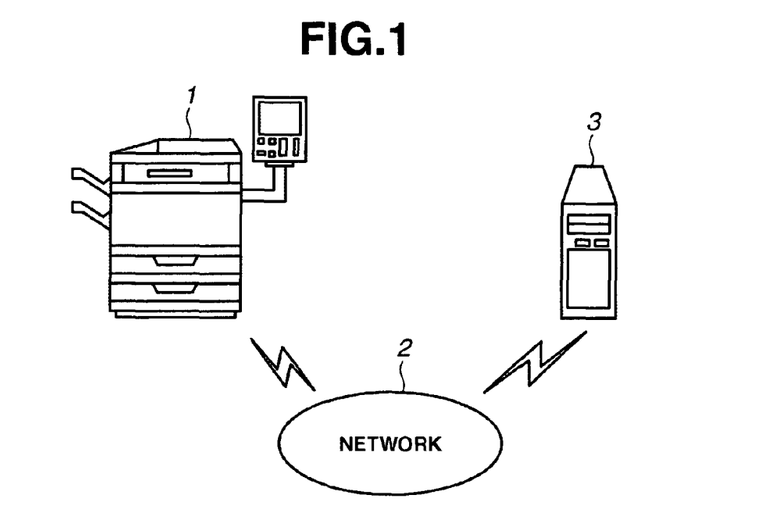
FIG. 1 shows an overall configuration of a system constructed by applying an image processing apparatus according to the present invention to a multiple-function printer 1.

FIG. 1 shows an overall configuration of a system constructed by applying an image processing apparatus according to the present invention to a multiple-function printer 1.

As shown in FIG. 1, the multiple-function printer 1 according to the present invention is connected to a network 2, and connected to an application server 3 via the network 2. The network 2 is further connected to a personal computer operated by a user, a file server for data management, and so on as required. In the following description, these terminals connected to the network 2, including the application server 3, will be generally referred to as the "external server".

The multiple-function printer 1 is provided with an operation panel as a user interface. The operation panel has a web browser function, which enables the multiple-function printer 1 to access the application server 3 via the network 2.

The application server 3 is a document management server which manages various document files or the like, and is also capable of issuing a print job.

Figure 2:
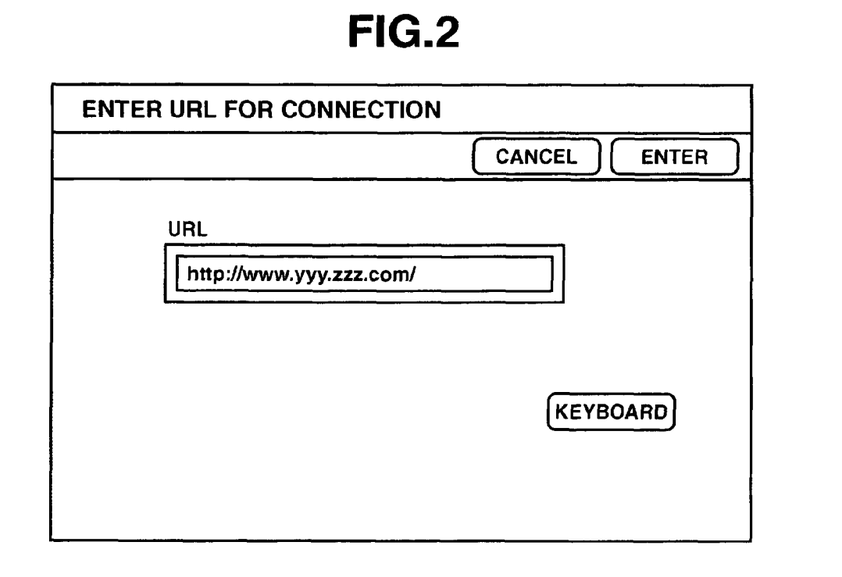
FIG. 2 shows an example of a screen layout displayed on an operation panel 10 (screen for entry of URL to be connected)

For printing a document file on the application server 3, for example, the multiple-function printer 1 accesses the application server 3 from the web browser provided in the operation panel thereof via the network 2. This operation can be performed by entering an IP (Internet Protocol) address or URL (Uniform Resource Locator) in a screen as shown in FIG. 2.

Figure 3:
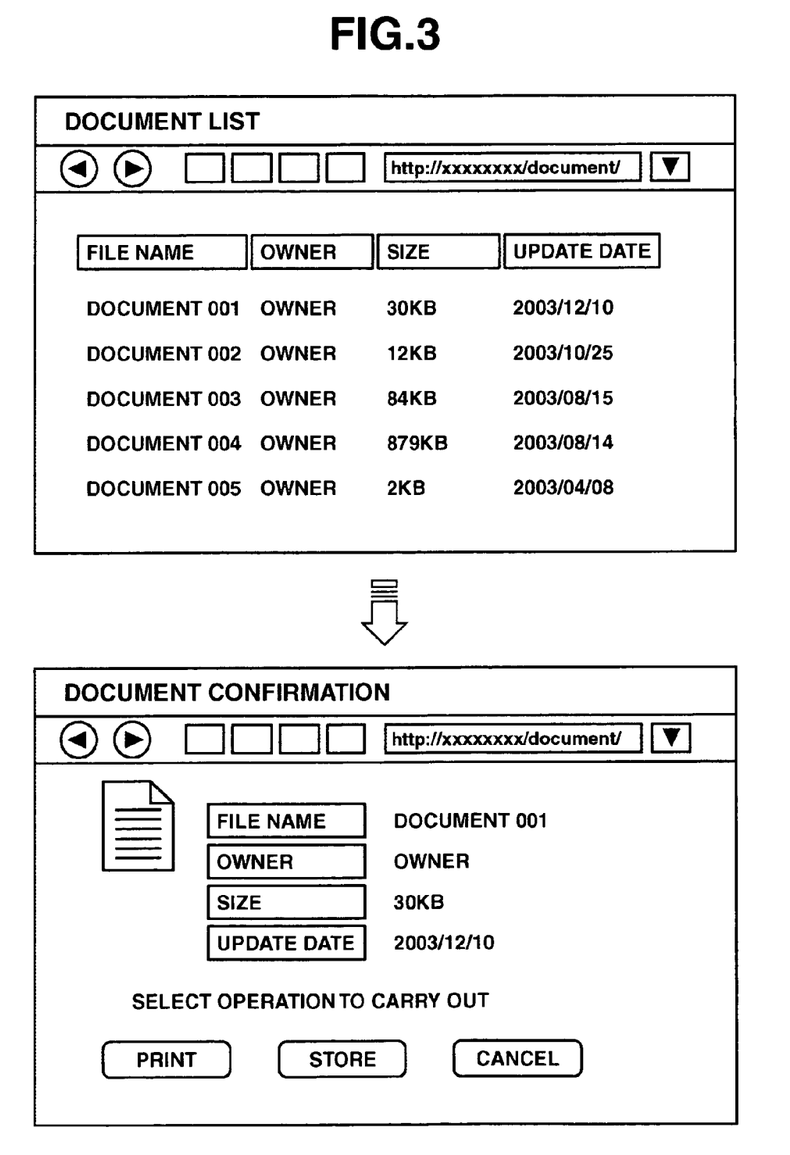
FIG. 3 shows an example of a screen layout displayed on the operation panel 10 (screen for document list and screen for document confirmation)

When the accessing has been performed normally, a list of documents managed by the application server 3 is displayed on the web browser to allow the user to select his/her desired document. Thus, the document file managed by the application server 3 can be printed out. The selection of the document is performed by checking the list of documents managed by the application server 3 on the screen as shown in FIG. 3, and selecting a desired document from the screen.

The multiple-function printer 1 is connected to the application server 3 via the network 2 in the configuration shown in FIG. 1. This network 2 may be an LAN (Local Area Network, a WAN (Wide Area Network) or any other as long as it enables the multiple-function printer 1 to communicate with the external servers.

Figure 4:
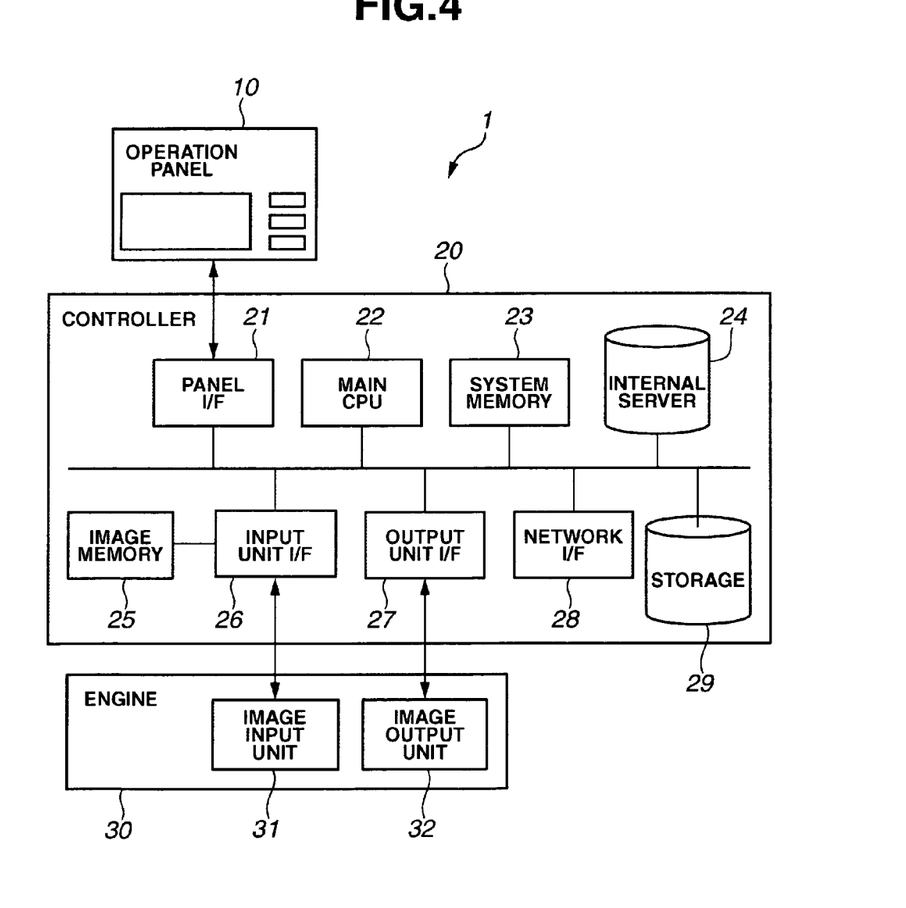
FIG. 4 is a block diagram illustrating an internal configuration of the multiple-function printer shown in FIG. 1.

FIG. 4 is a block diagram showing an internal configuration of the multiple-function printer 1 shown in FIG. 1. The same elements as those in FIG. 1 are designated by the same reference numerals.

As shown in FIG. 4, the multiple-function printer 1 is roughly composed of the operation panel 10 described above, a controller 20 for overall control of the multiple-function printer 1, and an engine 30 which performs image input/output processing based on an instruction from the controller 20.

The operation panel 10 is a user interface having an input device such as a touch panel or an operation button, and a display device such as an LED (Light Emitting Diode) or an LCD (Liquid Crystal Display).

As mentioned in the above, the operation panel 10 is provided with a web browser function. When the user operates the multiple-function printer 1, a web browser is displayed so that an internal server 24 of the multiple-function printer 1 is accessed from the web browser.

The controller 20 includes a panel I/F (interface) 21 which exchanges data with the operation panel 10 described above, a main CPU (Central Processing Unit) 22 which performs control and management of operation of various units of the multiple-function printer 1 according to a program stored in a system memory 23 to be described later, a system memory 23 which is a work area for executing a program or the like, an internal server 24 which holds setting information of the multiple-function printer 1 and various screen data, an image memory 25 for temporarily storing image data, an input unit I/F (interface) 26 which exchanges data such as input image data with an image input unit 31 to be described later, an output unit I/F (interface) 27 which exchanges data such as output image data with an image output unit 32 to be described later, a network I/F (interface) 28 which is an interface device for communicating with other apparatuses via the network 2, and a storage 29 which is a storage device for storing various data.

The engine 30 includes an image input unit 31 such as a scanner apparatus which reads image data formed on paper or the like, and an image output unit 32 such as a printer apparatus which forms image data on paper or the like. In this configuration, the control processing according to the present invention is executed by the main CPU 22.

Figure 5:
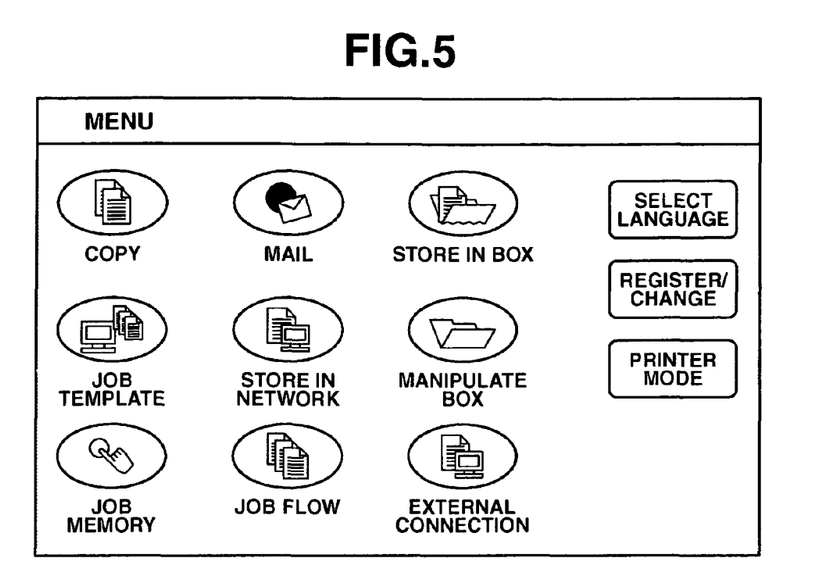
FIG. 5 shows an example of a screen layout displayed on the operation panel 10 (menu screen)

The internal server 24 described above has stored therein setting information of the multiple-function printer 1, and an HTML file which defines 'Look and Feel' (appearance and user-friendliness) of the operation panel 10. The setting and control operation of the multiple-function printer 1 is enabled by accessing the internal server 24 from the web browser of the operation panel 10. When the internal server 24 is accessed from the operation panel 10, an operation screen as shown in FIG. 5, for example, is displayed.

The multiple-function printer 1 is connected to the network 2 by the network I/F 28, so that the multiple-function printer 1 is able to access the application server 3 and also able to receive a print job from external servers on the network 2.

Figure 6:
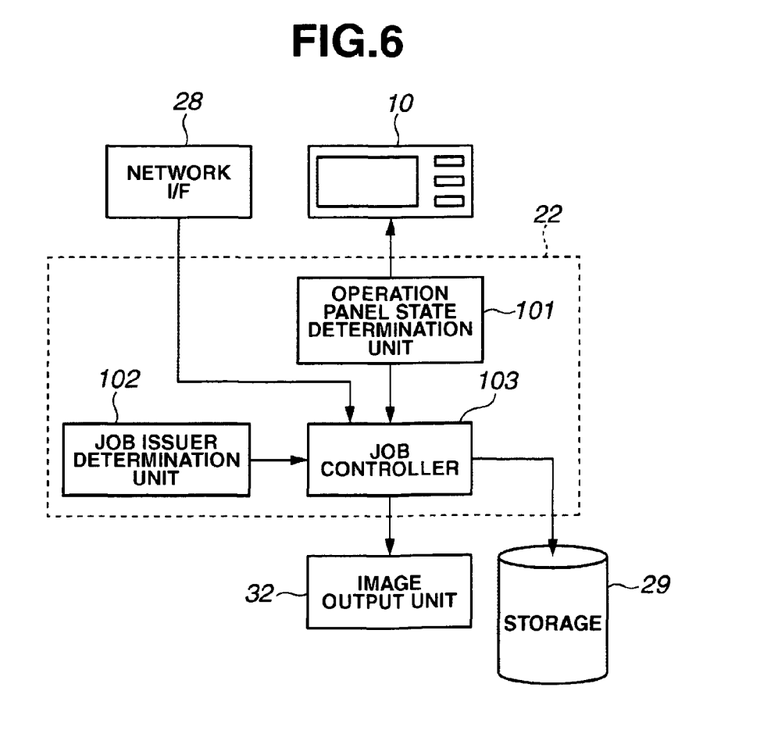
FIG. 6 is a functional block diagram illustrating a part of a functional configuration of the main CPU 22 shown in FIG. 4.

FIG. 6 is a functional block diagram illustrating a part of the functional configuration of the main CPU 22 shown in FIG. 4. The following description will be made only of constituent elements relating to the present invention. The same elements as those of FIG. 4 are designated by the same reference numerals.

As shown in FIG. 6, the main CPU 22 includes, as processing functional units, an operation panel state determination unit 101, a job issuer determination unit 102, and a job controller 103.

The operation panel state determination unit 101 is a processing unit that determines, when the operation panel 10 is being operated, whether or not the operation that is performed on the operation panel 10 is a control operation relating to the image processing apparatus, or the multiple-function printer 1 in this embodiment. Specifically, the operation panel state determination unit 101 performs the determination processing according to the determination criteria shown in the table of FIG. 7.

Figure 7:
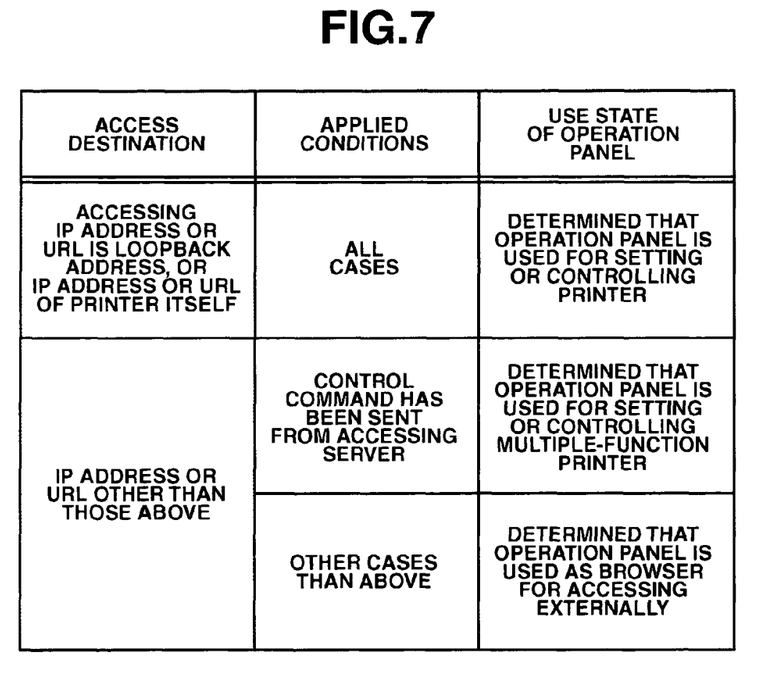
FIG. 7 shows in a table the criteria for the determination processing performed by the operation panel state determination unit 101 shown in FIG. 6.

As shown in FIG. 7, when the web browser of the operation panel 10 is accessing a loopback address or an IP address of the multiple-function printer 1, the operation panel state determination unit 101 determines that the operation performed on the operation panel 10 is for setting or controlling the multiple-function printer 1 (control operation relating to the multiple-function printer 1).

Whereas, when the web browser of the operation panel 10 is accessing an IP address or URL other than the loopback address or the IP address of the multiple-function printer 1, the operation panel state determination unit 101 determines that the operation performed on operation panel 10 is an operation to access externally. If a control command is received from an external server which is being accessed by the web browser of the operation panel 10, the operation panel state determination unit 101 determines that the operation performed on the operation panel 10 is a control operation for setting or controlling the multiple-function printer 1 (the control operation relating to the multiple-function printer 1).

If the operation panel state determination unit 101 determines that the operation performed on the operation panel 10 is a control operation relating to the multiple-function printer 1, the print job will be executed even when the operation panel 10 is being operated, as will be described later in detail.

Returning to FIG. 6, the job issuer determination unit 102 is a processing unit that determines, when a print job is received while the operation panel 10 is operated to access externally, whether the external server which issued the print job is the same one that is accessed from the operation panel 10.

If the job issuer determination unit 102 determines that the external server being accessed from the operation panel 10 is the same external server that issued the print job, the print job will be executed even when the operation panel 10 is being operated, as described later in detail.

The job controller 103 is a processing unit that executes a print job received at the network I/F 28 described with reference to FIG. 4. Specifically, even when the operation panel 10 is being operated, if the operation panel state determination unit 101 determines that the operation performed on the operation panel 10 is a control operation relating to the multiple-function printer 1, or if the job issuer determination unit 102 determines that the external server being accessed by the operation panel 10 is the same external server that issued the received print job, the job controller 103 executes the print job in cooperation with the image output unit 32. On the other hand, if the operation panel state determination unit 101 and the job issuer determination unit 102 otherwise determine, the print job is stored in the storage 29 until the job is executed.

Figure 8:
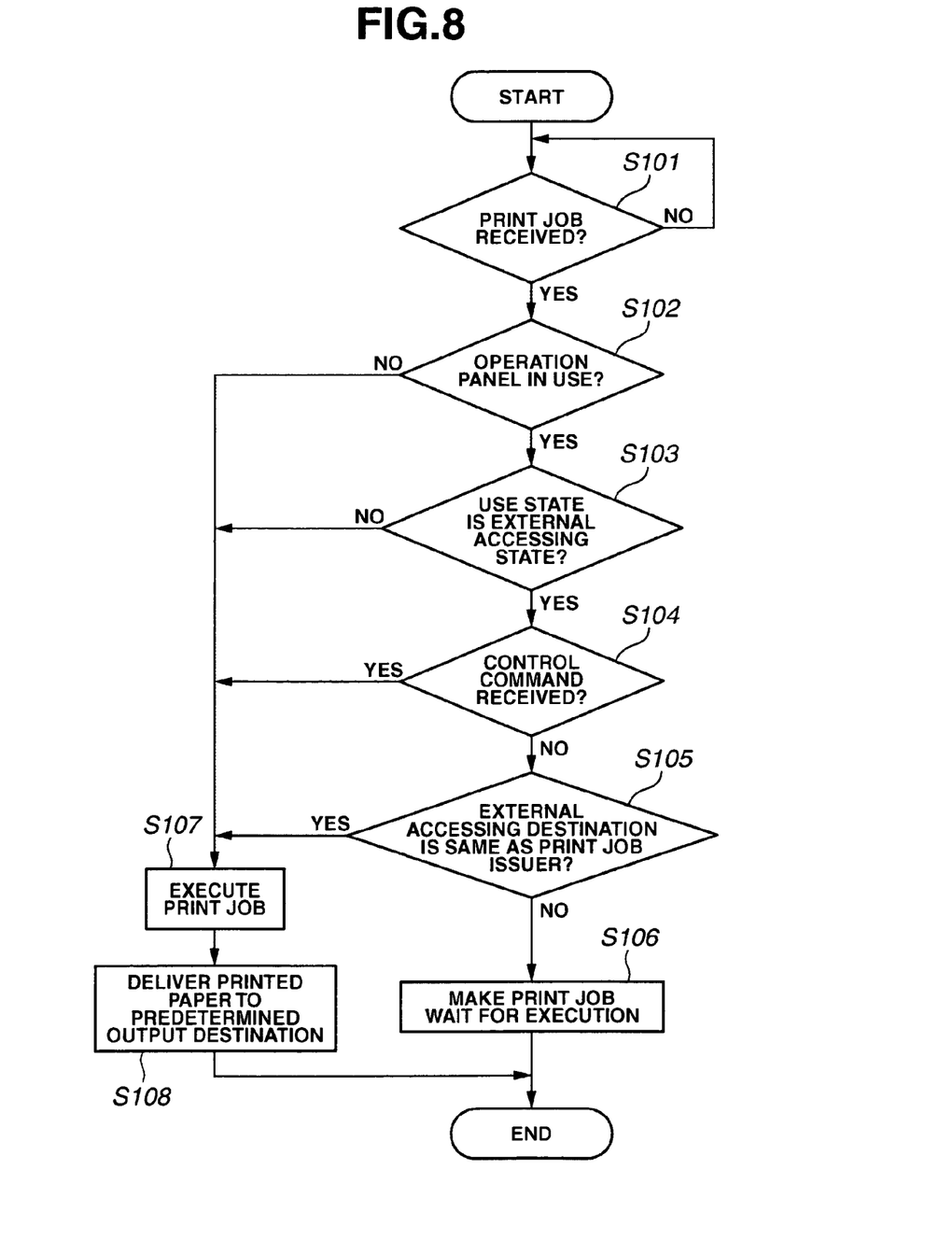
FIG. 8 is a flowchart illustrating a control processing operation performed by the multiple-function printer 1 shown in FIG. 1.

FIG. 8 is a flowchart illustrating a control processing operation performed by the multiple-function printer 1 shown in FIG. 1.

The control processing is started upon receipt of a print job from the application server 3 or an external server on the network 2 (YES in step S101).

Upon start of the processing, it is determined whether or not the operation panel 10 is being operated (step S102).

If it is determined that the operation panel 10 is not being operated (NO in step S102), the received print job is executed (step S107), and the printed paper is delivered to a predetermined output destination (step S108) to terminate this controlling processing. Whereas, if it is determined that the operation panel 10 is being operated (YES in step S102), it is then determined whether or not the use state is an external accessing state (step S103). Specifically, the operation panel state determination unit 101 determines whether or not the operation performed on the operation panel 10 is a control operation relating to the multiple-function printer 1 or an operation to access externally.

If it is determined that the operation performed on the operation panel 10 is a control operation relating to the multiple-function printer 1 (NO in step S103), the received print job is executed (step S107), and the printed paper is delivered to a predetermined output destination (step S108) to terminate this control processing. The predetermined output destination as used herein refers to a paper delivery tray which is separate from a paper delivery tray used by the user who is operating the operation panel 10. In other words, the printed sheets of paper are delivered to a delivery destination separate from the one used by the user who is operating the operation panel 10 so as to prevent the printed sheets of paper from being mixed up to confuse the user operating the operation panel 10.

If it is determined in step S102 that the operation performed on the operation panel 10 is an operation to access externally (YES in step S103), it is then determined whether or not a control command has been received from the externally accessing destination (step S104). As mentioned in the above, the operation panel state determination unit 101 determines that the operation performed on the operation panel 10 is a control operation relating to the multiple-function printer 1, also when a control command has been received from the external server which is being accessed by the operation panel 10.

If a control command has been received from the externally accessing destination (YES in step S104), the received print job is executed (step S107), and the printed paper is delivered to a predetermined output destination (step S108) to terminate this control processing. Whereas, if no control command has been received from the externally accessing destination (NO in step S104), it is then determined whether or not the external server which issued the print job received in step S101 is the same external server that is being accessed by the operation panel 10 (step S105). This determination processing is performed by the job issuer determination unit 102, which determines whether or not the IP address or URL entered in the web browser shown in FIG. 2 matches the IP address or URL of the external server which issued the print job.

If it is determined that the IP addresses or the URLs match with each other (YES in step S105), the received print job is executed (step S107), and the printed paper is delivered to a predetermined output destination (step S108) to terminate this control processing. Whereas, if it is determined that the IP addresses or the URLs are different from each other (NO in step S105), the job controller 103 stores the received print job in the storage 29 until the execution of the print job (step S106), and this control processing is terminated.

According to the present invention as described above, even if the operation panel 10 is being operated, the print job received from an external server or the like can be executed as long as the operation performed on the operation panel 10 is not an operation to execute a print job. Therefore, the use efficiency of the multiple-function printer 1 can be improved.

Second Embodiment

The description of the first embodiment above has been made in terms of a case in which, when a print job is received while the operation panel 10 is accessing externally, it is determined whether or not the external server which issued the print job is the same external server that is being accessed, based on whether the IP address or URL of the external server which issued the print job matches the IP address or URL entered in the web browser (step S105 in FIG. 8). A second embodiment of the present invention will be described in terms of a case in which a print job issuer is specified by assigning a job ID to each print job.

Figure 9:
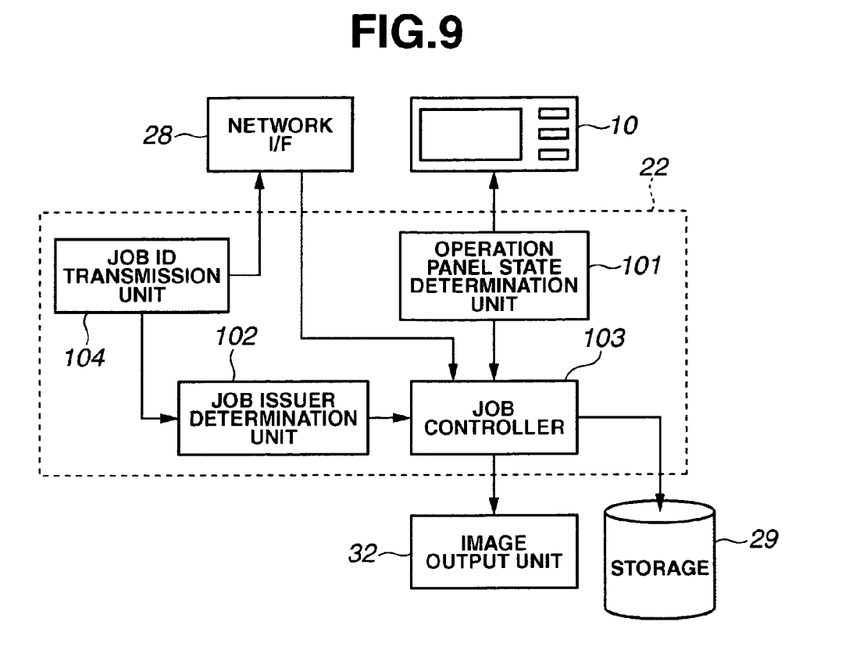
FIG. 9 is a functional block diagram showing a part of a functional configuration of a main CPU 22 according to a second embodiment.

FIG. 9 is a functional block diagram showing a part of a functional configuration of the main CPU 22 shown in FIG. 4. The main CPU 22 is further provided with a job ID transmission unit 104 in addition to the configuration of FIG. 6 according to the first embodiment. Those elements designated by the same reference numerals as in FIG. 6 operate in a substantially similar manner to those of FIG. 6, and therefore description of some of such elements will be omitted.

The job ID transmission unit 104 is a processing unit that generates a job ID to be assigned to a print job and transmits the job ID to the external server which issues the print job. At the same time therewith, the generated job ID is notified to the job issuer determination unit 102.

The job issuer determination unit 102 receives the notification of the job ID generated by the job ID transmission unit 104 and identifies an external server which issued the print job based on the job ID. Specifically, when a print job is received while the operation panel 10 is accessing externally, it is determined whether or not the print job is assigned with a job ID. If the print job is assigned with a job ID, it is determined whether or not the assigned job ID is the same as the job ID that has been generated and transmitted by the job ID transmission unit 104. If it is determined that the job IDs are the same, the received print job is executed even when the operation panel 10 is being operated.

Figure 10:
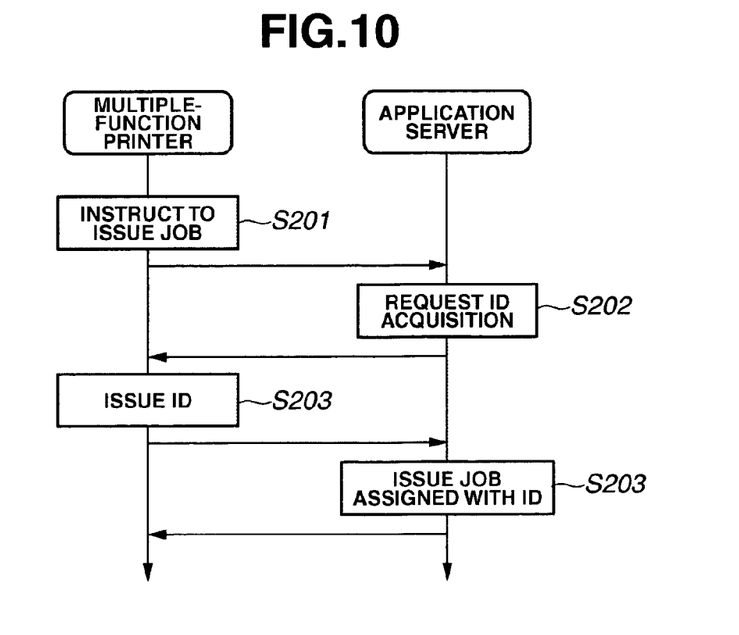
FIG. 10 is a sequence chart diagram showing the flow of processing for issuing a print job assigned with a job ID according to the second embodiment.

FIG. 10 is a sequence chart diagram illustrating the processing for issuing a print job assigned with a job ID. The following description will be made in terms of a case in which the external server which issued the print job is the application server 3.

In the first place, a user accesses the application server 3 from the operation panel 10 provided in the multiple-function printer 1, selects a desired document file from the document files managed by the application server 3, and then gives a print command. Specifically, the user presses the print button in the document confirmation screen shown in FIG. 3 (in the lower part of FIG. 3 below the arrow).

By this operation, a print job issuing instruction is transmitted from the multiple-function printer 1 to the application server 3. On the other hand, upon receiving the print job issuing instruction, the application server 3 transmits an ID acquisition request to the multiple-function printer 1.

Upon receiving the ID acquisition request, the multiple-function printer 1 issues a print job ID by means of the job ID transmission unit 104, and transmits the job ID to the application server 3. The application server 3 transmits the print job assigned with the job ID to the multiple-function printer 1. It is thus determined by the job issuer determination unit 102 that the print job assigned with the job ID has been issued by the application server 3.

According to the second embodiment as described above, the print job issuer is specified by assigning a job ID to each print job. In this case as well, control processing can be performed in a similar manner to that of the multiple-function printer 1 according to the first embodiment described above.

Although the embodiments have been described in terms of a case in which the image processing apparatus according to the present invention is applied to the multiple-function printer 1, it is to be understood that the control method of the image processing apparatus may be executed by a control program installed in the multiple-function printer 1.

It should also be understood that the present invention is not limited to the embodiments as described above and illustrated in the drawings, but may be otherwise variously embodied within the scope of the invention. For example, the present invention is of course applicable not only to multiple-function printers but also to image processing apparatuses in general such as printers, facsimiles, and copiers.

The image processing apparatus, and the control method and control program therefor according to the present invention are applicable to image processing apparatuses in general which has an operation panel and are capable of accessing an external server by operation of the operation panel, and are effectively usable particularly in office environment where the users are often obliged to wait until their desired print jobs are executed.

As described above, according to an aspect of the present invention, an image processing apparatus having an operation panel and capable of accessing a network by operation of the operation panel, comprises a determination unit that determines whether or not an operation performed on the operation panel is a control operation relating to the image processing apparatus; a print job receiving unit that receives a print job from the network; and a job control unit that executes the print job received by the print job receiving unit if the determination unit determines, when the print job is received by the print job receiving unit, that the operation panel is being operated and that the operation performed on the operation panel is a control operation relating to the image processing apparatus.

According to another aspect of the present invention, the image processing apparatus further comprises a job issuer determination unit that determines whether or not the print job received by the print job receiving unit is a print job issued by an external server which is being accessed by the operation of the operation panel via the network, wherein the job control unit executes the print job received by the print job receiving unit if the job issuer determination unit determines, when the print job is received by the print job receiving unit, that the operation panel is being operated and that the print job is issued by an external server which is being accessed.

According to still another aspect of the present invention, in the image processing apparatus, the job issuer determination unit comprises a job ID transmission unit that transmits a job ID to the external server which is being accessed by the operation of the operation panel via the network; and a job ID determination unit that determines whether or not the print job received by the print job receiving unit is a print job assigned with the job ID, and wherein the job control unit executes the print job received by the print job receiving unit if the a job ID determination unit determines, when the print job is received by the print job receiving unit, that the operation panel is being operated and the print job is assigned with the job ID.

According to further aspect of the present invention, a method of controlling an image processing apparatus having an operation panel and capable of accessing a network by operation of the operation panel, comprises determining, by a determination unit, whether or not an operation performed on the operation panel is a control operation relating to the image processing apparatus; and executing, by a job control unit, a print job received by a print job receiving unit, in receiving the print job via the network by the print job receiving unit, when the operation panel is being operated and if the determination unit determines that the operation performed on the operation panel is a control operation relating to the image processing apparatus, or when the operation panel is being operated and if a job issuer determination unit determines that the print job is a print job issued by an external server which is being accessed.

According to still further aspect of the present invention, a storage medium is readable by a computer, and stores a program of instructions executable by the computer to perform a function for causing the computer to execute processing of an image processing apparatus having an operation panel and capable of accessing a network by operation of the operation panel, the function comprising determining whether or not an operation performed on the operation panel is a control operation relating to the image processing apparatus; receiving a print job from the network; determining whether or not the receive print job is a print job issued by an external server which is being accessed by the operation of the operation panel via the network; and executing the received print job, in receiving the print job, when the operation panel is being operated and if it is determined that the operation performed on the operation panel is a control operation relating to the image processing apparatus, or when the operation panel is being operated and if it is determined that the print job is a print job issued by the external server which is being accessed.

With the above configurations, if the operation panel is being operated when receiving a print job, it is determined whether or not the operation performed on the operation panel is a control operation relating to the image processing apparatus. The received print job is executed, if it is determined that the operation is a control operation relating to the apparatus, or if the print job is received while the operation panel is being operated to access an external server, and it is determined that the print job is received from the external server being accessed. Therefore, the use efficiency of the image processing apparatus can be improved. Also, it can be avoided that the users other than the operator of the operation panel are obliged to wait for a long time until execution of their printing jobs.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-275795 filed on Sep. 22, 2004 including specification, claims, drawings and abstract is incorporated herein by reference in its entirety.

What is claimed is:

1. An image processing apparatus having an operation panel including a web browsing function and a web server and capable of accessing a network by operation of the web browsing function on the operation panel, the image processing apparatus comprising:
a memory storing instructions and a print job; and
a processor configured to act on the instructions so as to act as: a determination unit that determines whether an operation performed on the operation panel is an operation to access the web server, or whether the operation performed on the operation panel is an operation to access the image processing apparatus;
a print job receiving unit that receives a print job from the network; and
a job control unit that executes the print job received by the print job receiving unit if the determination unit determines, when the print job is received by the print job receiving unit while the operation panel is being operated, that the operation performed on the operation panel is the operation to access the web server, and the web server is the same web server that issued the print job, and the job control unit causes the print job to be stored if the determination unit determines that the operation performed on the operation panel is an operation for entering an IP address of a server different from the IP address of the web server that issued the print job.

2. The image processing apparatus according to claim 1, further comprising a job issuer determination unit that determines whether or not the print job received by the print job receiving unit is a print job issued by an external web server which is being accessed by the operation of the operation panel via the network,
wherein the job control unit executes the print job received by the print job receiving unit if the job issuer determination unit determines, when the print job is received by the print job receiving unit, while the operation panel is being operated, that the print job received by the print job receiving unit is the print job from the external web server that is being accessed by the operation of the operation panel.

3. The image processing apparatus according to claim 2, wherein
the job issuer determination unit comprises:
a job ID transmission unit that transmits a job ID to the external web server which is being accessed by the operation of the operation panel via the network; and
a job ID determination unit that determines whether or not the print job received by the print job receiving unit is a print job assigned with the job ID transmitted by the job ID transmission unit, and
wherein the job control unit executes the print job received by the print job receiving unit if the job ID determination unit determines, when the print job is received by the print job receiving unit while the operation panel is being operated, that the print job is the print job assigned with the job ID transmitted by the job ID transmission unit.

4. A method of controlling an image processing apparatus having an operation panel including a web browsing function and a web server and capable of accessing a network by operation of the web browsing function by the operation panel, the method comprising: a step of receiving a print job by a print job receiving unit from the network and storing the print job in a memory; a step of determining, by a determining unit, whether an operation performed on the operation panel is an operation to access the web server, or whether the operation performed on the operation panel is an operation to access the image processing apparatus; a step of determining, by a job issuer determination unit, whether or not the print job received by the print job receiving unit is a print job issued by an external web server which is being accessed by the operation of the operation panel via the network, and a step of executing, when the print job is received by the print job receiving unit while the operation panel is being operated, the print job received by the print job receiving unit if the determining unit determines that the operation performed on the operation panel is the operation to access the web server, and the web server is the same web server that issued the print job or if the job issuer determination unit determines that the print job is the print job from the external web server that is being accessed by the operation of the operation panel, and causing the print job to be stored if the determining unit determines that the operation performed on the operation panel is an operation for entering an IP address of a server different from the IP address of the web server that issued the print job.

5. A non-transitory computer-readable medium storing a program of instructions executable by a computer to perform a function for causing the computer to execute processing of an image processing apparatus having an operation panel including a web browsing function and a web server and capable of accessing a network by operation of the web browsing function by the operation panel, the function comprising: a step of receiving a print job from the network and storing the print job in a memory of the computer; a step of, when the print job is received by a print job receiving unit determining whether the operation to access the web server is performed by the operation panel, or whether the operation performed on the operation panel is an operation to access the image processing apparatus; a step of determining by a job issuer, whether the print job received in the print job receiving step is a print job from the external web server via the network by the operation of the operation panel; and a step of executing, when the print job is received in the print job receiving step while the operation panel is being operated, the print job received in the print job receiving step if determined in the determining step that the operation performed on the operation panel is the operation to access the web server, and the web server is the same web server that issued the print job, or if determined in the job issuer determining step that the print job is the print job from the external web server that is being accessed by the operation of the operation panel, and causing the print job to be stored if the determining unit determines that the operation performed on the operation panel is an operation for entering an IP address of a server different from the IP address of the web server that issued the print job.

6. The image processing apparatus according to claim 2, wherein when the operation performed on the operation panel is an operation to access the external web server and the issuer of the received print job is an external web server different from the external web server that is an accessing destination of the operation, the received print job is stored and is on hold.

* * * * *